July 20, 1965

R. K. WILSON 3,195,798

BOX

Filed March 2, 1964

INVENTOR.
ROY K. WILSON
BY
Baldwin & Martin
ATTORNEYS

INVENTOR.
ROY K. WILSON

July 20, 1965  R. K. WILSON  3,195,798
BOX
Filed March 2, 1964  5 Sheets-Sheet 3

INVENTOR.
ROY K. WILSON
BY
Baldwin & Martin
ATTORNEYS

July 20, 1965 R. K. WILSON 3,195,798
BOX
Filed March 2, 1964 5 Sheets-Sheet 4

INVENTOR.
ROY K. WILSON
BY
Baldwin & Martin
ATTORNEYS

United States Patent Office 3,195,798
Patented July 20, 1965

3,195,798
BOX
Roy K. Wilson, Zanesville, Ohio, assignor to The Greif Bros. Cooperage Corporation, Zanesville, Ohio, a corporation of Delaware
Filed Mar. 2, 1964, Ser. No. 348,417
10 Claims. (Cl. 229—37)

This invention relates to a novel and improved construction for boxes and is particularly adapted for use in connection with boxes for transporting fruit and vegetables. More particularly, this invention is directed to novel and improved means for closing and locking such a box and for impeding and detecting unauthorized opening of such a box or container.

Corrugated kraft board is commonly employed in the construction of boxes, and the blanks therefor, for use in the transportation or storage of produce and the like. Such fiberboard typically comprises a pair of spaced apart, parallel, flat liner sheets between which is engaged and adhesively secured a corrugating medium which imparts strength to the overall construction. Such a construction of fiberboard is commonly referred to in the trade as single wall corrugated board. While the present invention is particularly adapted to boxes constructed of single wall corrugated board, it will be understood by, as well as apparent to, those skilled in the art that double wall corrugated board or other suitable materials may be used in the construction of a box or container incorporating this invention.

In boxes of the type described, it is a known method of fabrication to cut and stamp a flat piece of corrugated board to provide a box blank. The finished blank includes a score or fold lines and incised or cut portions defining, at least, the walls or side and end panels of the main body of the box. The blank is usually shipped flat to the packing plant, where it is then erected for use by folding along the fold lines and securing portions of the blank in a suitable manner to provide the body of the box, which might by way of example be hollow and rectangular in shape. The box body, after such erection or setting-up, may comprise a rectangular tube open at both its top and bottom. In other cases the blank may be fabricated so that the set-up box body is provided with integral, hinged by connected flaps which may be folded and secured so as to close one or both of the top and bottom of the box, such as in the form of a full or half slotted container. This invention is concerned with boxes of the type or construction wherein a separate closure member or cover is provided for closing one or both of the top and bottom of the box body.

Where a separate closure member is provided for the bottom of the box, it is of course necessary that means be provided for securely connecting the closure member to the body of the box. Where a separate closure member is provided for the top of the box body, it is also desirable to provide means to connect the top closure member or cover to the body in a secure manner so as to prevent or impede accidental opening of the box and spilling of the contents. However, in certain instances it is also desirable that there be provided means for deterring unauthorized opening of the box or pilferring of its contents.

Accordingly, it is the primary object of the present invention to provide in a box of the general class described and having a separate closure member for either or both of the top and bottom of the box body, novel and improved means for securing the closure member to the box body so as not only to prevent unintentional or accidental opening of the box but also to provide means for detecting if there has been an unauthorized opening of the box. A further object is to provide locking tabs for a box cover which automatically erect as the cover is placed in position, thereby to provide quick and secure closure of the box. Other objects and advantages of the invention will be in part apparent to those skilled in the art and in part described in detail hereinafter.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 1:
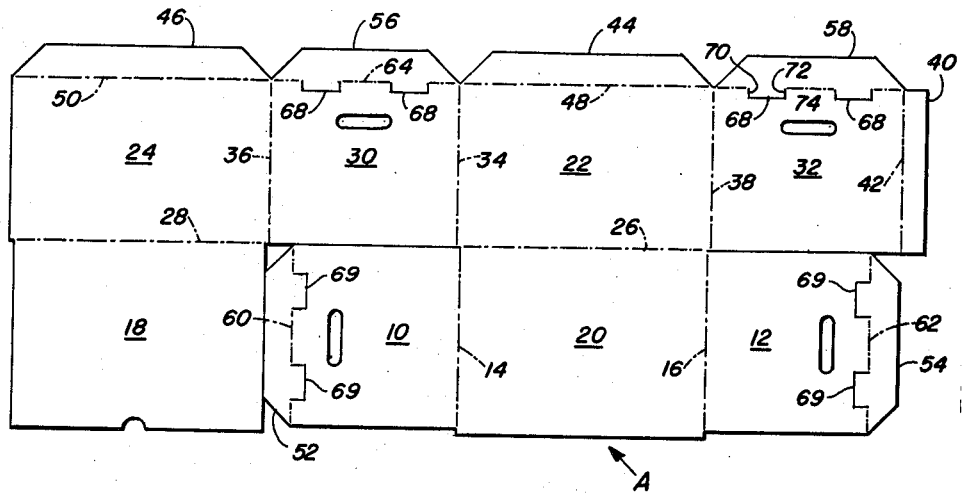
FIG. 1 is a plan view of a blank for a box body constructed in accordance with the present invention.
Figure 2:
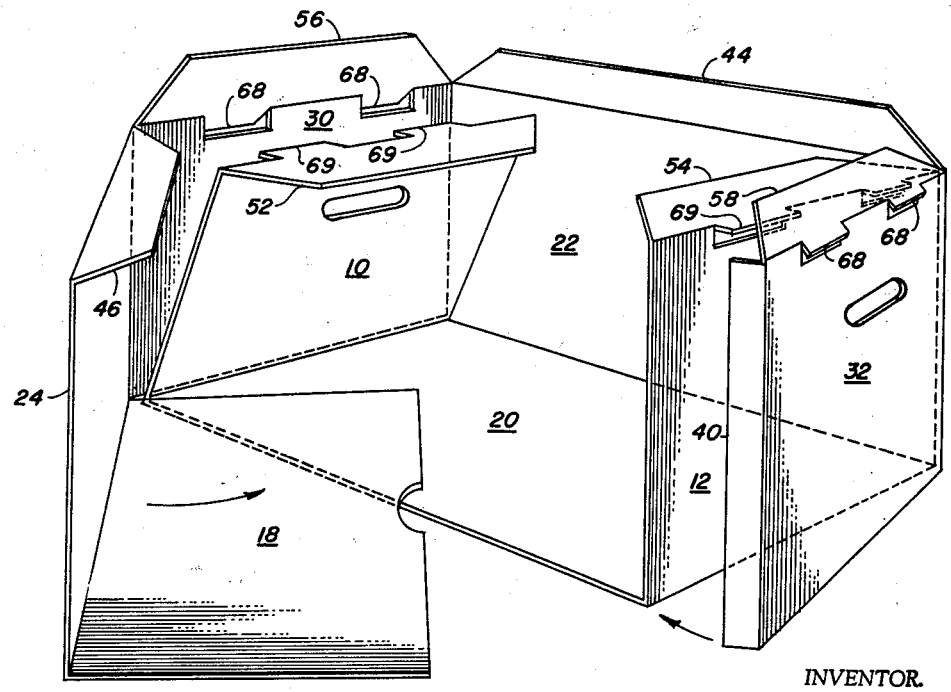
FIG. 2 is an enlarged, perspective view of the blank of FIG. 1 in a partially set-up condition.
Figure 3:
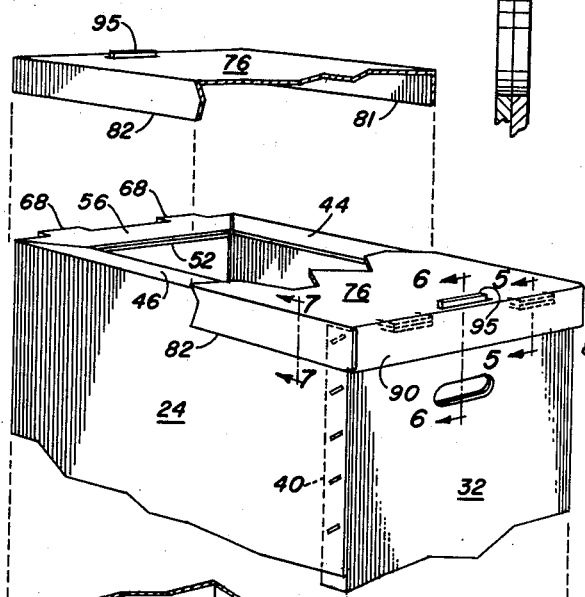
FIG. 3 is an exploded view, partly in section, of a box comprising the blank of FIG. 1, fully set-up, and with a cover constructed in accordance with this invention applied to the top of the box body.
Figure 3:
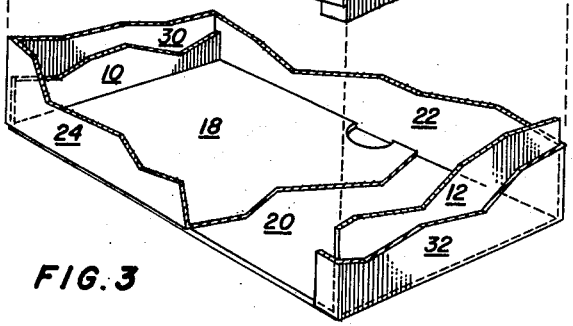

With reference to FIGS. 1 to 7 of the drawings, there is shown an exemplary box or container incorporating the present invention. With particular reference to FIG. 1, the blank for the box body is generally indicated at A. The blank is shown in its finished form after it has been cut from a piece of flat single wall corrugated board so as to have the desired peripheral outline and so as to be scored to provide the necessary fold lines (which are indicated as broken lines) and the necessary incisions or cuts (which are indicated in full line). With reference to FIGS. 1 to 3, the blank A is constructed to provide a box body having double thickness end and bottom walls or panels. More particularly, but merely by way of example, the box body is set-up by folding the inner end walls 10 and 12 along the fold lines 14, 16, respectively, into vertical position, whereby the end walls extend at right angles to the inner and outer horizontal bottom walls 18 and 20, respectively. The side walls 22, 24 may then be folded into a vertical position along the fold lines 26 and 28, respectively. The outer end walls 30 and 32 being integrally connected to the side walls will thereby also be set into a vertical position.

The outer end wall 30 may then be folded along the fold line 34 so as to lie parallel to and alongside the inner end wall 10. The side wall 24 may then be folded along the fold line 36 into a position parallel to the opposite side wall 22, and at the same time the inner bottom wall 18 is inserted between the inner end walls 10 and 12 and in overlying resting relation to the outer bottom wall 20. If desired, the inner bottom wall 18 may be adhesively or otherwise suitably secured to the outer bottom wall 20 although such adhesion is not normally desired. The outer end wall 32 is then folded along the fold line 38 so that the wall 32 lies alongside the wall 12. The end wall 32 terminates at its free end in a glue lap or locking flap 40 hingedly connected to the end wall at the fold line 42. The flap 40 is folded over and inserted under the free end of the side wall 24 and is then suitably secured thereto such as by stitching as shown in FIG. 3, or by gluing or other means.

The blank A further comprises a pair of upper side wall flaps 44 and 46 hingedly connected to the top edge of the side panels 22 and 24, respectively, along fold lines 48 and 50, respectively, whereby the flaps may be folded inwardly of the box opening so as to overlie the contents of the box, to provide support for the box cover, and to actuate the locking tabs, as will hereinafter be described in more detail. The end walls 10, 12, 30 and 32 are likewise provided with similar flaps 52, 54, 56 and 58 which are hingedly connected to top edges of the respective end wall panels along fold lines 60, 62, 64 and 66. However, in accordance with the invention, the fold lines 60, 62, 64 and 66 are discontinuous each having, intermediate its ends, a pair of locking tabs or tongues formed from material of the respective end panel. These tabs, which are designated at 68 on the panels 30, 32 and at 69 on the panels 10, 12 are formed in a generally similar manner with respect to each of the side and end walls. Therefore only the specific construction of one of the tabs 68 on the panel 32 will now be described in detail, it being understood that the remaining tabs are similarly formed except as otherwise explained hereinafter.

The tab 68 is generally rectangular in plan with its length dimension extending transversely of the panel 32 parallel to the fold line 66 and its width dimension extending at right angles to the fold line. As can be seen from FIG. 1, the body of the tab is entirely formed from material taken from the panel. More particularly, a pair of cut lines 70, 72 extend from the fold line at right angles thereto and away from the flap 58. The cut lines 70, 72 each terminate at the end of a cut line 74 extending parallel to the fold line 66. Accordingly, when the flap 58 is folded inwardly of the set-up box so that the flap extends at right angles to the end panel, the tab will move out of the general plane of the panel along with the flap of which the tab is an integral part, so that the tab also extends at right angles to the panel but in a direction outwardly of the box from the top edge of the panel. The other tabs 68 are formed in the same manner to the same dimensions. However, for a reason to be more fully explained hereinafter, the tabs 69 are formed with a width greater than the width of the tabs 68 by an amount substantially equal to the thickness of the corrugated board from which the box blank is fabricated. Also, while each of the end panels has been shown and described as having a pair of tabs spaced apart longitudinally of the fold line for the respectively associated flap, it will be understood that this is merely by way of illustration and that the number of tabs on each panel may be varied, particularly as a result of variations in box size. Further, the size of the tabs and their relative dimensions may vary with the size or type of box. However, for a reason which will be apparent, where the box is constructed to have double thickness end walls, with each of the inner and outer end walls being provided with tabs, it may be preferred, as in the specific embodiment being described, that the relative location of the flaps on each wall be such that when each respectively associated inner and outer end wall is located in juxtaposition to the other in overlying relation, each tab on each of the end walls will, as shown in broken lines at the rightward upper end of FIG. 3, be registerable in overlying relation with a tab on the other end wall of the pair. It will be apparent that, if the orientation of the blank is such as to cause the wall panels to comprise vertically corrugated board, the locking tabs will be desirably stronger than for other orientation of the corrugations.

Figure 4:
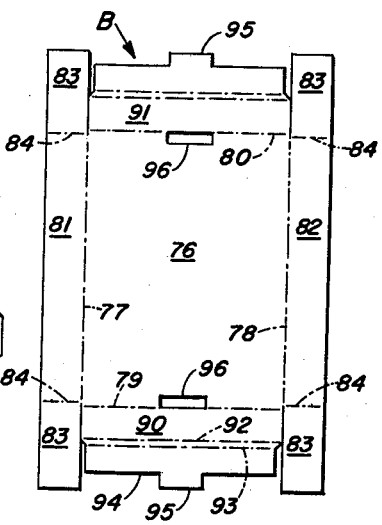
FIG. 4 is a reduced scale, plan view of the blank for the cover of the box in FIG. 3.

Turning now to the cover for the box of FIG. 3, the blank for the cover is generally indicated at B in FIG. 4. The blank B as in the case of the blank A previously described is shown in its finished form, having been cut from a piece of single wall corrugated board to provide the desired peripheral outline. The blank B is also provided with fold lines and incisions or cut lines indicated in the same manner as in the blank of FIG. 1. More particularly, the blank B comprises a center panel 76 of rectangular plan and defined by fold lines 77 to 80 inclusive. The blank further comprises side panels or walls 81 and 82 extending longitudinally of the fold lines 77, 78. Each of the side walls 81, 82 terminate at each end in an end anchor flap 83 which is essentially a continuation of the side wall. Each anchor flap is hingedly connected to the respective end of a side wall by a fold line 84 which extends parallel to the fold lines 79 and 80. For a reason which will be hereinafter apparent, each fold line 84 is spaced inwardly of the next adjacent fold line 79 or 80 a distance substantially equal to the thickness of the board from which the blank B is fabricated. The blank B further comprises a pair of end walls 90 and 91 at the opposite ends, respectively, of the panel or wall 76, with the end walls being hingedly connected to the panel 76 by the fold lines 79 and 80. The end and side walls are preferably of equal width. The outer or lower longitudinal edge of each end wall is defined by a fold line 92 extending parallel to the fold line 79. The blank is further provided with a fold line 93 extending parallel to each fold line 92 and spaced therefrom on the side opposite the panel 76 a distance substantially equal to the thickness of the blank. Each fold line 93 hingedly connects to the remainder of the blank an inner end wall friction locking flap or reentrant flap 94 which extends parallel to the respectively associated end wall.

For reasons which will be apparent, the ends of each locking flap are spaced inwardly from the ends of the associated end wall by an amount substantially equal to the thickness of the blank B; and the locking flaps are of a width less than that of the end walls by a predetermined amount. Each of the locking flaps 94 has integral therewith a locking tab 95 located intermediate the ends of the flap and extending from the outer free edge of the flap in the general plane of the flap. Correspondingly, and for a reason to be explained, the panel 76 is provided with a slot or opening 96 aligned with each tab 95 and defined at one longitudinal edge by a fold line connecting the panel to one of the end walls. Each slot 96 is of a width at least equal to the thickness of the associated tab 95 and of a length substantially equal to the length of the associated tab 95.

Figure 6:
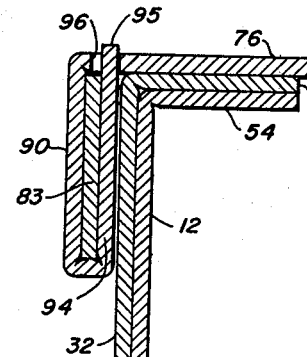
FIG. 6 is an enlarged, fragmentary, cross-sectional view substantially along the line 6—6 of FIG. 3.
Figure 7:
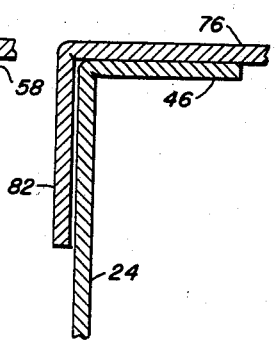
FIG. 7 is an enlarged, fragmentary, cross-sectional view substantially along the line 7—7 of FIG. 3.

In setting-up the cover, the side walls 81, 82 are folded upwardly, for example out of the plane of the drawing, and into right angle relation to the panel 76 as shown in FIG. 7. The anchor flaps 83 are then folded inwardly of the panel 76 so as to extend generally along the fold lines 79 and 80. The anchor flaps are each of a length no greater than the one-half the length of the end walls so that the ends of the anchor will not overlap. The blank is then folded along the fold lines 79 and 80 so that the end walls 90, 91 are juxtaposed with the anchor flaps 83, as shown in FIG. 6. The blank is then further folded along the fold lines 92 and 93 so that each of the locking flaps is juxtaposed with the anchor flaps on the side opposite thereof to the end walls of the cover, and the locking tabs 95 are inserted into the slots 96, all as shown in FIG. 6. The tabs 95 extend through and should fit snugly in the slots 96 either at the ends of the tabs or at the faces of the tabs or a combination thereof to provide a friction lock. With the elements of the cover assembled as described, the anchor flaps 83 are nested and frictionally held or clamped between the end walls and locking flaps to retain the cover in assembly.

Figure 5:
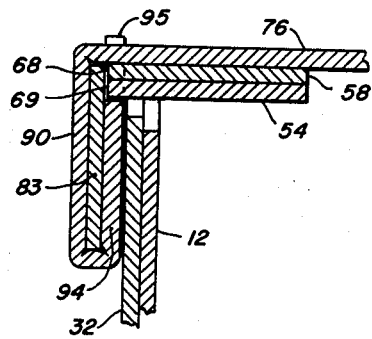
FIG. 5 is an enlarged, fragmentary, cross-sectional view substantially along the line 5—5 of FIG. 3.

In assembling the cover and the box body, the body flaps are folded to incline inwardly of the box so that the tabs 68 and 69 incline outwardly of the box. The cover is placed over the top of the body and pressed downwardly with the main panel 76 contacting the flaps 44, 46, 56 and 58 and urging these flaps, as well as flaps 52 and 54 to swing toward horizontal position until the cover panel rests on the top surface of the body flaps, as shown in FIG. 7. The tabs 68, 69 are urged farther and farther out as the cover is applied and are finally received between the longitudinal free edges of the locking flaps 93 of the cover and the main cover panel 76, all as shown in FIG. 5. As can be seen from FIG. 5, there will be interference between the body tabs and the lower edge of the depending end wall assembly of the cover as the cover is placed on the body. However, the body flaps carrying these tabs are free to be inclined upwardly and they and the tabs 68, 69 and the connection therebetween is sufficiently flexible that the tabs may more or less be snapped into the position shown in FIG. 5. The body and cover blank elements are so dimensioned that when the body and cover are assembled, the inner surfaces of the depending side and end wall portions of the cover are in closely spaced relation or engaged with the next adjacent outer surfaces of the box body. Also as will be seen in FIG. 5, the free longitudinal edge of each of the locking flaps of the cover is located at least closely adjacent to, if not engaged with, the underside of the body tab 69. In this manner the cover is in effect clamped or locked to the box body.

In the preferred construction of the box of this invention, the width of the body tabs 69 are greater than that of the tabs 68 so that when the tabs are in overlying engagement as shown in FIG. 5, the outer edges of the tabs will be in registry. Also it will be observed that in the embodiment just described the tabs 68, 69 extend outwardly of the box body a distance sufficient to be engaged by the cover locking flaps but insufficiently to cause interference with the cover anchor flaps. When the cover is placed on the body it will be observed as in FIG. 5 that the top surface of the flaps 56, 58 and their integral tabs are in underlying engagement with the under surface of the cover main panel 76. The width of the tabs 68 and the stiffness of the hinges 64 are sufficient that upward force on the underside of the tabs will not permit free pivoting of the flaps 56, 58 to permit the tabs to be disengaged from the cover. Also, when the box is filled the contents will ordinarily either be engaged by or be closely spaced from the underside of the flaps on the body so that any downward pivoting of the flaps is substantially prevented. Further, in the embodiment being described the pivot axes of the upper body flaps 56, 58 are displaced in a direction outwardly of the ends of the box from the corresponding axes of the lower flaps 52, 54. Accordingly, any attempt to remove the cover by lifting it will be resisted, and the only way the cover can be lifted off is by the application of sufficient force that the tabs 68, 69 will be torn or materially deformed so as to be thereafter useless or much less effective. Thus it will be readily apparent when there has been any unauthorized opening of the box. Furthermore, since the locking means is not visible externally, nor operable to permit free opening, there is no invitation to open the box. One must force his way in.

Figure 8:
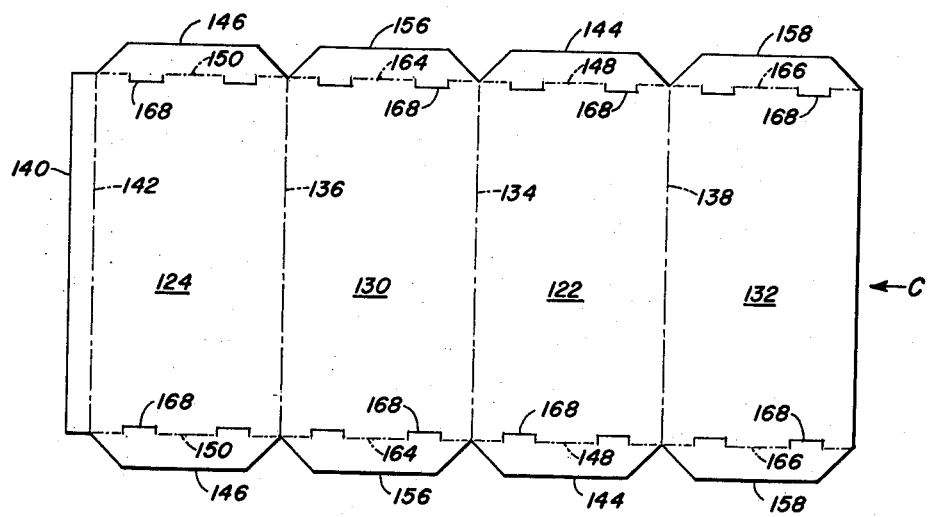
FIG. 8 is a plan view of an alternative construction of a box body blank constructed in accordance with this invention.

With reference to FIGS. 8 to 14, there is illustrated an alternative body and closure construction incorporating the present invention. In order to facilitate an understanding of this construction similar reference numerals, but in the 100 series, have been used to designate elements similar or corresponding in structure and/or function to those in the previously described embodiment. With reference to FIG. 8, the box body blank is generally indicated at C and comprises four walls or panels 122, 124, 130 and 132. As in the previously described body blank A, the blank C is cut from a piece of single wall corrugated board. The panels are of equal width and rectangular in shape with fold lines extending longitudinally of the panels to hingedly connect next adjacent panels. Each of the panels terminates at each end thereof in a fold line which hingedly connects a flap to the end of the panel. Each of these fold lines is discontinuous, there being a pair of spaced apart locking tabs 168 intermediate the ends of each fold line. As in the previously described embodiment, the tabs 168 are integral with and lie in the same plane as the body flaps. Each of the flaps is identical in construction and is constructed primarily to cooperate with closure members for closing both ends of the box body rather than serving as closure members themselves.

Figure 9:
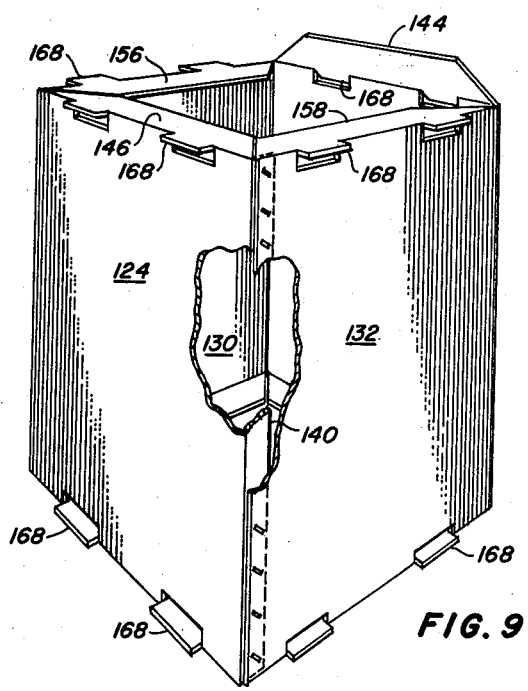
FIG. 9 is an enlarged, perspective view, partly in section, of the blank of FIG. 8 set-up into a box body.

In setting-up the body, and with reference to FIGS. 8 and 9 the panels 124, 130 and 122 are folded along the fold lines 136, 134 and 138, respectively, to form a square cross-sectioned, hollow tube. The locking flap 140 extending along the outer edge of the panel 124 is folded along the fold line 142 and inserted under the free edge of the panel 132. The flap 140 is then suitably secured to the panel 132, such as by stapling. The flaps 144, 146, 156 and 158 are then folded along the fold lines 148, 150, 164 and 166 and inwardly of the body so that the tabs 168 extend outwardly of the walls of the body. The body is now ready for the application of closure members to the open ends thereof.

Figure 10:
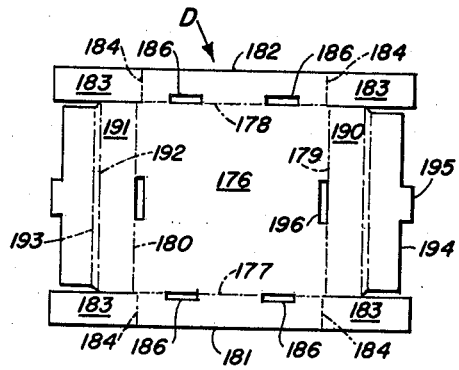
FIG. 10 is a plan view of a blank, to the scale of FIG. 8, for a closure member for the top or bottom of the body of FIG. 9 and constructed in accordance with the present invention.

The blanks for the closure members for each end of the box body are typically identical, and one such blank is indicated generally at D in FIG. 10. The closure blank comprises a main panel 176 which is square in plan and is defined by fold lines 177, 178, 179 and 180. The blank further comprises parallel wall members 181 and 182 each terminating at their opposite ends in anchor flaps 183. The flaps 183 each have a length less than one-half the length of the walls 181 and 182. The wall members 181, 182 extend along one pair of opposite edges of the panel 176. A second pair of parallel wall members 190, 191 extend along the other pair of opposite edges, respectively, of the panel 176. Disposed outwardly of and extending parallel to each of the wall members 190, 191 is a locking flap 194 having a locking tab 195 extending from its free edge and lying in the same plane as the flap. The panel 176 is also provided with a slot or opening 196 aligned with each tab 195 and defined at one edge by the fold line connecting the panel to the next adjacent wall member 190, 191. In accordance with this aspect of the invention, the wall members 181 and 182 are each provided with a pair of slots or openings 186 spaced apart and extending longitudinally of the wall member. Each of the slots 186 is defined at one edge by the fold line connecting the respectively associated wall member with the panel 176.

Figure 12:
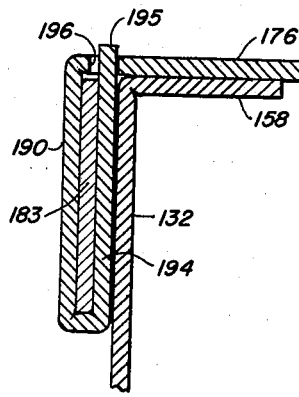
FIG. 12 is an enlarged, fragmentary, cross-sectional view substantially along the line 12—12 of FIG. 11.
Figure 13:
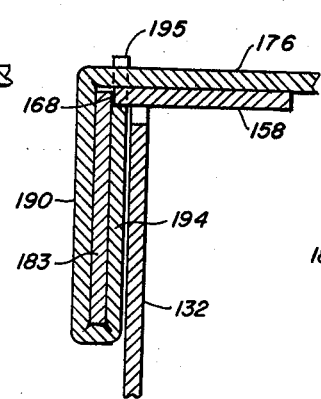
FIG. 13 is an enlarged, fragmentary, cross-sectional view substantially along the line 13—13 of FIG. 11.
Figure 14:
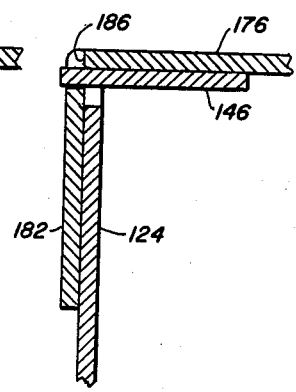
FIG. 14 is an enlarged, fragmentary, cross-sectional view substantially along the line 14—14 of FIG. 11.
Figure 11:
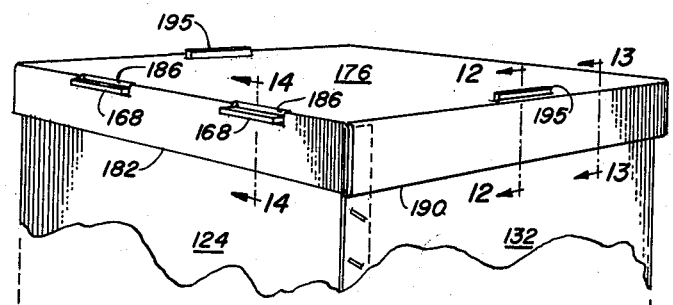
FIG. 11 is an exploded, fragmentary, perspective view of the box body of FIG. 9, to an enlarged scale, with a fully set-up cover utilizing the blank of FIG. 10 applied to the top of the body and illustrating a bottom closure member utilizing the blank of FIG. 10 and in a partially set-up condition.
Figure 11:
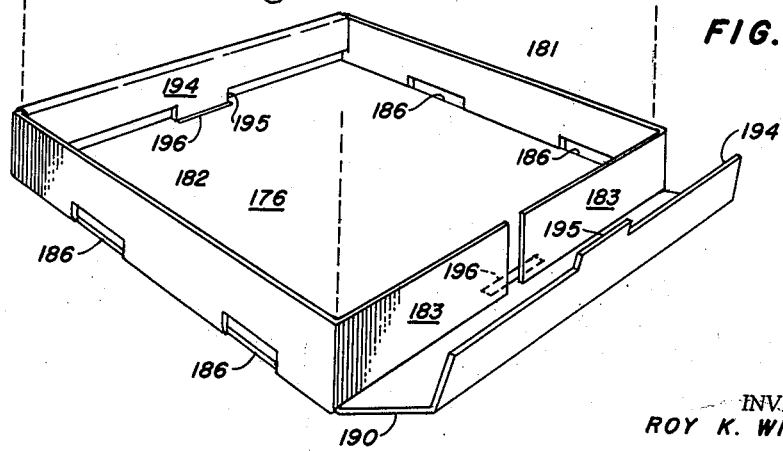
Figure 15:
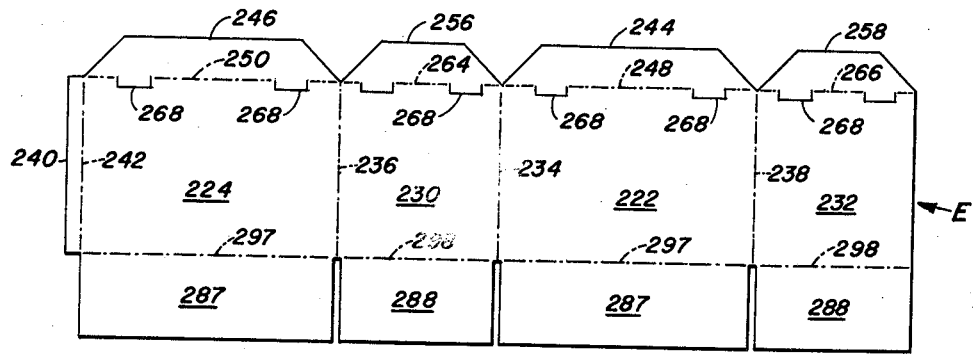
FIG. 15 is a plan view of another alternative construction for a blank for a box body constructed in accordance with this invention.

In setting-up the blank D into a closure member, and as will be apparent from a consideration of FIGS. 11 to 14, the wall members 181, 182 are folded so as to extend at right angles to the panel 176, and the anchor flaps 183 are folded along the fold lines 184 so as to lie along the fold lines 179, 180. The wall members 190, 191 are then folded in the same manner as the members 181, 182, and the locking flaps 194 are folded over the free edges of the anchor flaps 183 utilizing the fold lines 192, 193, and the locking tabs 195 are inserted into the slots 196 to hold the closure member in assembly. The closure member is then applied to one end of the box body in the same manner as was described in connection with the previous embodiment. However, in the present embodiment, not only is the closure member locked to the body by the cooperation between the locking flaps 194 and the locking tabs 168 on the body walls 130 and 132, as shown in FIG. 13, but also as shown in FIGS. 11 and 14 locking action is provided by the cooperation between the tabs 168 on the walls 122 and 124 and the lower bordering edge portions of the slots 186 through which these tabs 168 extend.

With the exception of the aspect involving the double flaps providing the overlying tabs 68 of the previous embodiment, the relative dimensional relationships and cooperation between the various elements of the body and closure member of the previous embodiment as shown and described in connection with FIGS. 5 and 6 are also present in this embodiment, as is illustrated in FIGS. 13 and 12, respectively, and will thus not need to be described further in order for one skilled in the art to have a full appreciation of this aspect of the invention as applied to this embodiment. However, with reference to FIG. 14, it should be noted that the outer or lower bordering edge portion of the slots 186 are either closely spaced relative to or engaged with the underside of the tabs 168 on the body walls 122, 124 when the closure member is assembled on the body with the flaps 148, 150 in underlying engagement with the inner face of the main panel 176 of the closure. Thus, all of the objects and advantages of the previous embodiment are present in the present embodiment, and in addition locking action is provided along all sides or walls of the closure.

With reference to FIGS. 15 to 18, there is illustrated a further alternative box construction incorporating the present invention. With the exception of obvious geometric changes, it will be apparent that the box of this embodiment is the same as the box of the last previously described embodiment, with the further exception that it is in the form of a half slotted carton having integral bottom flaps and panels. Accordingly, to facilitate an understanding of the present construction and in the interest of brevity of description, similar reference numerals, but in the 200 series, have been used to designate elements similar or corresponding in structure and/or function to those of the last previously described embodiment. The structure and set-up of the body blank generally indicated at E in FIG. 15 will be readily apparent to those skilled in the art from a consideration of the description of set-up of the last previously described embodiment together with the reference numeral usage described above. Therefore, no further description of the construction of the box body is necessary except to point out that after the walls of the body are set-up and the locking flap 240 secured to the wall 232, the bottom flaps 288 of the end walls 230 and 232 are folded inwardly of the body along the fold lines 298 and then the bottom panels 287 of the side walls 222 and 224 are folded inwardly of the body along the fold lines 297 so as to underlie the panels 288. The widths of the panels 287 and 288 are equal, and the width of the panels 287 is selected so that the longitudinal free edges of the panels will be next adjacent each other or engaged when the panels are folded, as described. The bottom panels and flaps may be secured in any manner known to those skilled in the art to provide a firm bottom wall for the box.

Figures 16, 18:
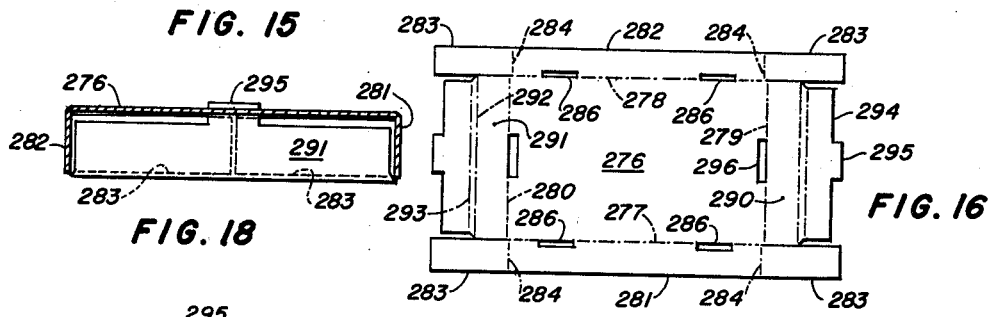
FIG. 16 is a plan view of a blank for a cover constructed in accordance with this invention and for use in association with the body set-up from the blank of FIG. 15.
FIG. 18 is a cross-sectional view through the cover of FIG. 17 taken substantially along the line 18—18 of FIG. 17.
Figure 17:
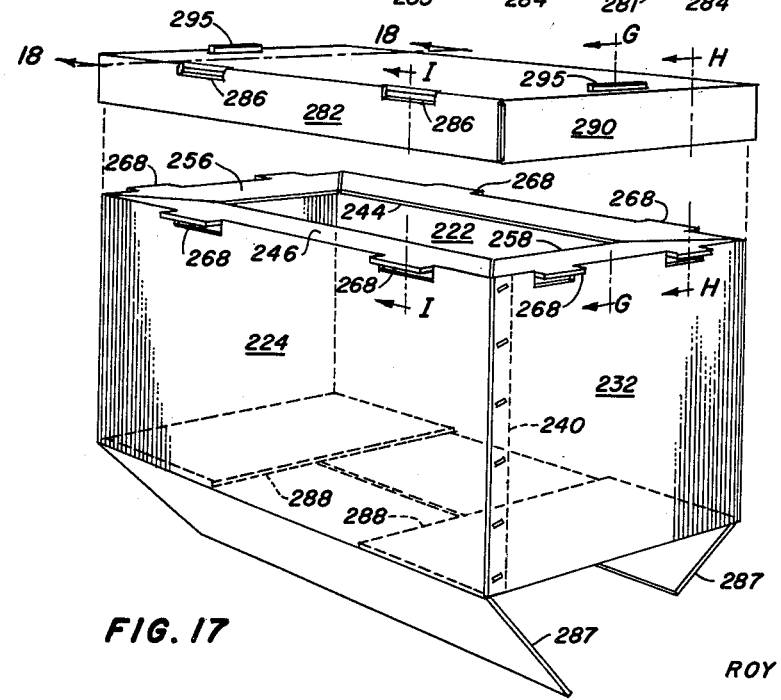
FIG. 17 is an enlarged, exploded, perspective view of the blank of FIG. 15 substantially completely set-up into a box body and of a cover set-up from the blank of FIG. 16.

With the exception of obvious differences in geometric configuration, the closure blank of FIG. 16 is identical with the closure blank of FIG. 10. Accordingly, the structure of the blank and closure member of this embodiment as shown in FIGS. 16 to 18, as well as the set-up thereof, will be readily apparent to one skilled in the art from a consideration of the description of the closure member of the last described embodiment together with the manner of usage of reference numerals as described above. Correspondingly, the elements of the body and closure member of this embodiment which cooperate to lock the closure member to the body do so in the same manner as in the last previously described embodiment and have the same dimensional relationships necessary to assure that the box of the present embodiment has all of the objects and advantages of the box of FIGS. 8 to 14 as regards the closing of the top thereof. For example, views taken substantially along the lines G—G, H—H and I—I of FIG. 17 when the cover is locked onto the body will correspond to FIGS. 12, 13 and 14, respectively. Accordingly, no further description of the present embodiment is necessary nor will be provided.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a corrugated fiberboard box having a body with a plurality of walls and being open at one end, and a closure member separate from said body for closing said one end; said closure comprising a main panel extending across said one end of the body and a plurality of walls depending from and foldably connected along fold lines to the edges of said main panel, the closure walls lying parallel to and in closely outwardly spaced relation to the walls of said body, some of the closure walls terminating in integral foldably connected reentrant flaps disposed in parallel relation to and between the closure and body walls, said flaps terminating short of said main panel, the other closure walls being provided with openings defined in part by the fold lines between the walls and main panel, a plurality of body flaps respectively foldably connected to the ends of the body along fold lines at said one end of the body and extending inwardly of the body in underlying relation to said main panel, each of said body flaps having at least one integral tab extending outwardly of the body from the fold line between the body flap and wall and lying in the same general plane as the body flap, each tab next adjacent one of said redirected flaps extending between said main panel and the end of the redirected flap and terminating short of the next adjacent closure wall, the tabs on the other body flaps extending into said openings in said other closure walls, the lower surfaces of said tabs are engageable by the ends of said redirected flaps and the lower bordering edge portions of said openings to impede lifting of the closure from said one end of the body.

2. In a box having a body with a plurality of walls, a pair of which are oppositely disposed and each include a pair of separate overlying wall members, said body being open at one end, and a closure separate from the body for closing said one end of the body; each wall member of said pair thereof being provided with a flap foldably connected to the wall member along a fold line at said one end of the body, the flaps of each respectively associated pair thereof extending inwardly of the body in overlying engagement and being provided with integral tabs extending outwardly of the body from the fold lines of the respective flaps in overlying engagement, the tabs on the outer flaps being wider than the tabs on the inner flaps so that the outer ends of the tabs of each overlying pair thereof are in registry, the closure being provided with a main panel extending across said one end of the body in overlying relation to said flaps, the closure having integral walls depending from the edges of said panel and lying outwardly of and next adjacent the walls of said body, and means on the closure walls next adjacent said tabs engageable with the underside of each of the tabs disposed farther from said main panel to impede lifting of the closure from said one end of the body.

3. A box as described in claim 2 in which the last mentioned means includes a redirected flap foldably connected to each closure wall associated with said tabs along the edge of the closure wall remote from said main panel, each redirected flap being disposed between the respectively associated closure wall and next adjacent body wall and terminating in a surface facing said main panel and lying closely adjacent to and being engageable with the underside of the next adjacent tab, the tabs terminating short of the next adjacent closure wall.

4. In a box having a four sided body formed at least in part by four vertical walls and being open at one end, and a closure member separate from said body for closing said one end; said closure comprising a horizontal panel extending across said one end of the body and a wall depending from and foldably connected along fold lines to each peripheral edge of said panel, said closure walls lying outwardly of and parallel to and closely adjacent the walls of said body, one pair of said closure walls being on opposite sides of said panel and each terminating in an integral foldably connected locking flap lying parallel to and between the next adjacent closure and body walls, each locking flap terminating short of said main panel and having a locking tab integral with and extending from the free edge of the flap next adjacent said panel, said panel being provided with openings within which said tabs are inserted, the other pair of closure walls terminating at their ends in anchor flaps foldably connected thereto and lying between the closure walls of said one pair thereof and associated locking flaps in clamped relation, the body walls associated with said one pair of closure walls each being provided with an integral flap foldably connected to the wall along a fold line extending along the end of the wall at said one end of the body, the body flaps extending inwardly of the body in underlying relation to said panel, each body flap being provided with at least one integral coplanar tab extending outwardly of the body from the fold line between the flap and body wall, each body flap tab next adjacent one of said locking flaps extending between said panel and said free edge of the locking flap and terminating short of the next adjacent closure wall, said free edge of each locking flap lying closely adjacent to and being engageable with the underside of the next adjacent body flap tab with the tab extending across said free edge a distance at least substantially equal to the thickness of the locking tab.

5. A box as described in claim 4 in which the other pair of body walls are each provided with an integral flap foldably connected to the wall along a fold line extending along the end of the wall at said one end of the body, the flaps on said other pair of body walls each extending inwardly of the body in underlying relation to said panel and each being provided with at least one integral coplanar tab extending outwardly of the body from the fold line between the flap and body, the other pair of closure walls each being provided with openings into which the tabs on the body flaps of said other pair of body walls extend, said openings being defined in part by the fold lines between said other pair of closure walls and said panel and each having a lower bordering edge portion lying closely adjacent to and engageable with the underside of the tab extending into the opening.

6. A box as described in claim 4 in which each of said body walls associated with said one pair of closure walls comprises a pair of inner and outer juxtaposed wall members each provided with an integral flap as described, the flaps and tabs of the outer wall members being in overlying engagement with the flaps and tabs of the inner wall members, the outer ends of each pair of overlying tabs being in registry.

7. Box blank means comprising a corrugated fiberboard box body blank constructed and arranged to provide a plurality of panels which will form the vertical walls of a box body when the box is set-up, one pair of said panels being adapted to form opposite walls of the box and another pair of said panels being adapted to form opposite walls of the box, each of said panels having an integral coplanar flap connected thereto along a fold line extending along an edge of the panel corresponding to one end of said body, said blank further being constructed and arranged to provide a box body open at said one end thereof, each of said flaps having a free edge extending parallel to the fold line between the flap and associated panel and having at least one integral coplanar tab extending inwardly of the associated panel from the fold line between the flap and panel, each tab being separated from the associated panel by cut lines whereby when the body is set-up the flaps may be folded inwardly of the body so that the tabs extend outwardly of the body, the corrugations of said wall and flaps and tabs being vertical to provide bending resistance to said tabs and to provide stacking strength to said walls when the body is set-up, and a closure blank separate from the body blank constructed and arranged to provide a panel for extending across and closing said one end of said body, the closure blank being provided with coplanar wall portions connected to peripheral edges of the closure panel along fold lines with said wall portions being constructed and arranged to depend from said closure panel and lie outwardly of and adjacent to the walls of the body formed respectively by said one and said other pair of panels of the body blank, the pair of wall portions respectively associated with said one pair of body panels being connected to coplanar locking flaps along fold lines extending parallel to the fold lines between the wall portions and closure panel in outwardly spaced relation thereto with said fold lines between the closure wall portion and locking flaps being constructed and arranged so that said locking flaps may be folded relative to said wall portions so as to lie parallel to and inwardly of said wall portions when said wall portions are depending from said closure panel, said locking flaps each having a free edge extending parallel to said last mentioned fold lines and spaced from the next adjacent of said last mentioned fold lines a predetermined distance less than the width of the associated wall portion so that when the locking flaps are folded as described the free edges thereof will be spaced from the underside of said closure panel an amount sufficient that when the set-up closure is placed on said one end of the set-up body the free edges of the locking flaps will closely underlie the undersurface of a next adjacent tab on the pair of flaps on said one pair of panels of the body blank, the tabs of the last mentioned body flaps having a predetermined width such that the outer ends of the tabs will terminate short of the next adjacent surface of the closure when the closure and body are set-up and assembled as described, the pair of closure wall portions respectively associated with said other pair of body panels having openings for receiving the tabs on the flaps on said other pair of body panels and defined in part by the fold lines between the last mentioned pair of closure wall portions and said closure panel and each having a predetermined width so that when the closure and body are set-up as described the lower bordering edge portions of said opening will closely underlie the under surface of the tab received therein.

8. In a corrugated fiberboard box having a four sided body including four vertical walls each connected to the next by a wall angle, said body being open at one end, and a closure member separate from said body for closing said one end; said closure comprising a horizontal panel extending across said one end of the body and a wall depending from and foldably connected along fold lines to each peripheral edge of said panel, said closure walls lying outwardly of and parallel to and closely adjacent the walls of said body, one pair of said body walls associated with one pair of said closure walls and each being provided with an integral flap foldably connected to the wall along a fold line extending along the end of the wall at said one end of the body, the body flaps extending inwardly of the body in underlying relation to said panel and generally perpendicularly to said body walls attached thereto, each body flap being provided with a pair of spaced integral coplanar tabs extending outwardly of the body from the fold line between the flap and the body wall and located adjacent respective said wall angle, a plurality of closure edges associated with said one pair of closure walls for lockingly engaging the underside of said body flap tabs, each body flap tab extending outwardly sufficiently into engagement with a closure edge and being disposed between said closure edge and the lower surface of said panel of said closure member, the corrugations in the tabs being arranged generally perpendicular to the fold line between the flap and body wall from which the tabs extend outwardly of the body to stiffen same and provide bending resistance thereto whereby said closure member and body are securely locked.

9. In a corrugated fiberboard box having a four sided body including four vertical walls and being open at one end, and a closure member separate from said body for closing said one end; said closure comprising a horizontal panel extending across said one end of the body and a wall depending from and foldably connected along fold lines to each peripheral edge of said panel, said closure walls lying outwardly of and parallel to and closely adjacent the walls of said body, one pair of said closure walls being on opposite sides of said panel and each terminating in an integral foldably connected locking flap lying parallel to and between the next adjacent closure and body walls, each locking flap terminating short of said main panel and having a locking tab integral with and extending from the free edge of the flap next adjacent said panel, said panel being provided with openings within which said locking tabs are engaged, each of the other pair of closure walls terminating at their ends in anchor flaps foldably connected thereto and lying between said one pair of said closure walls, the body walls respectively associated with said one pair of closure walls being provided with integral flaps foldably connected to the walls along fold lines extending along the ends of the walls at said one end of the body, said body flaps extending inwardly of the body in underlying relation to said panel and each being provided with at least one integral coplanar tab extending outwardly of the body from the fold line between the body flap and body wall, a closure edge associated with said closure member inwardly thereof and next adjacent each said coplanar tab for engagement therewith, each body flap tab extending between the lower surface of said panel of said closure member and respective said closure edge and terminating short of the next adjacent closure wall, each of said closure edges lying closely adjacent to and being engageable with the underside of the next adjacent body flap tab with the tab extending thereacross a distance at least substantially equal to the thickness of the locking tabs, the corrugations of each of said body flaps extending across said closure edges thereby to provide substantial resistance to bending of said body flaps along a line parallel to said one of said closure edges.

10. In a corrugated fiberboard box having a four sided body including four vertical walls and being open at one end, and a closure comprising a horizontal panel extending across said one end of the body and a wall depending from and foldably connected along fold lines to each peripheral edge of said panel, said closure walls lying outwardly of and parallel to and closely adjacent the walls of said body, one pair of said closure walls being on opposite sides of said panel and each terminating in an integral foldably connected reentrant flap lying parallel to and between the next adjacent closure and body walls, the reentrant flaps each terminating short of said main panel and each having a free edge underlying said panel, the other pair of closure walls terminating at their ends in anchor flaps foldably connected thereto and lying between the closure walls of said one pair thereof and associated reentrant flaps, said anchor flaps each having a free edge extending parallel to said free edge of the associated reentrant flaps, the body walls respectively associated with said one pair of closure walls being provided with integral flaps foldably connected to the walls along fold lines extending along the ends of the walls at said one end of the body, said body flaps extending inwardly of the body in underlying relation to said panel and each being provided with at least one integral coplanar tab extending outwardly of the body from the fold line between the body flap and body wall, each body flap tab extending between said panel and the free edges of the respectively associated anchor and reentrant flaps and terminating short of the next adjacent closure wall, at least one of said free edges of said anchor and reentrant flaps lying closely adjacent to and in engagement with the underside of the next adjacent body flap tab with the tab extending across said one of the free edges a distance at least substantially equal to the thickness of the locking tabs, the corrugations of each of said body flaps extending across said one of said free edges thereby to provide substantial resistance to bending of said body flaps along a line parallel to said one of said free edges.

References Cited by the Examiner

UNITED STATES PATENTS

| 1,411,678 | 4/22 | Walker | 229—34 |
| 1,700,402 | 1/29 | Ethridge | 229—37 X |
| 1,859,645 | 5/32 | Anderson | 229—45 |
| 2,025,589 | 12/35 | Huye | 229—45 X |
| 2,331,754 | 10/43 | Wohlers | 229—45 X |
| 2,418,963 | 4/47 | Anderson | 229—37 |
| 2,839,236 | 6/58 | Dunning | 229—45 |

FOREIGN PATENTS 15,576  12/33  Australia.

GEORGE O. RALSTON, *Primary Examiner.*